March 23, 1954  R. LUCIEN  2,672,955
HYDRAULIC VIBRATION DAMPER
Filed Nov. 28, 1951  3 Sheets-Sheet 1
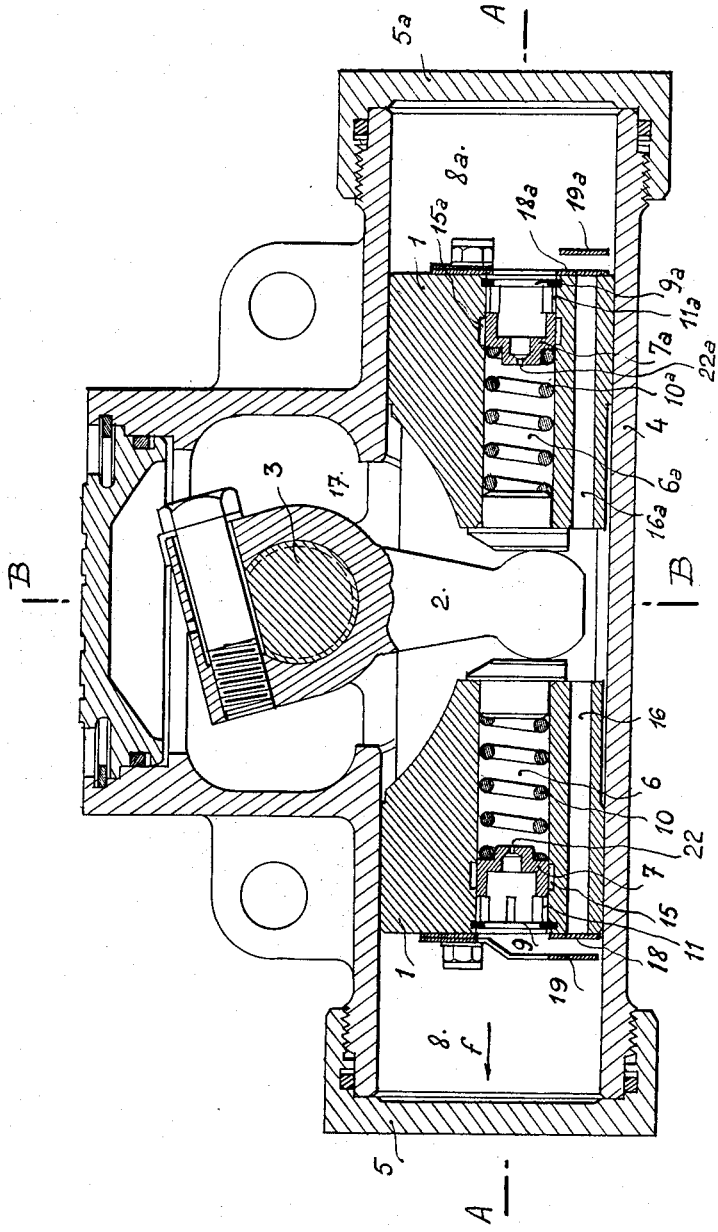
INVENTOR
RENÉ LUCIEN
By:
Haultain, Lake & Co.
AGENTS

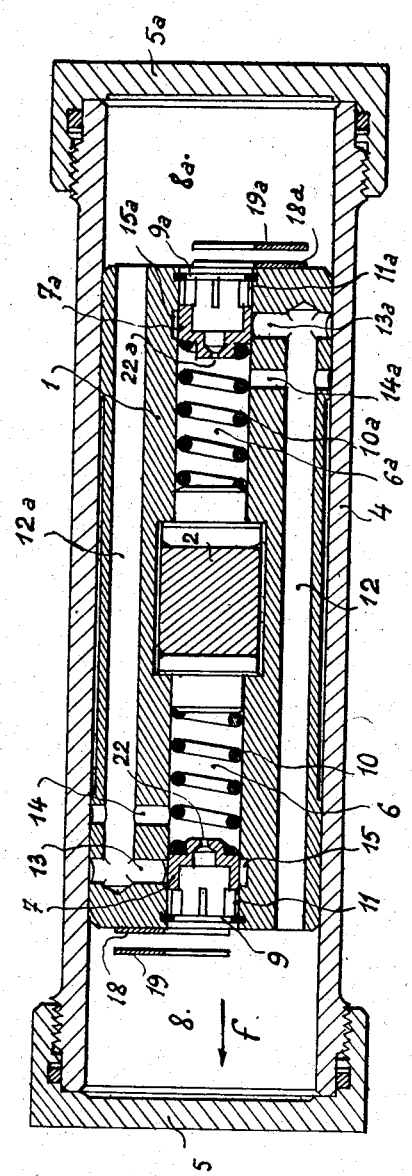

March 23, 1954  R. LUCIEN  2,672,955
HYDRAULIC VIBRATION DAMPER
Filed Nov. 28, 1951  3 Sheets-Sheet 3

INVENTOR
RENÉ LUCIEN
By:
Haseltine, Lake & Co.
AGENTS

Patented Mar. 23, 1954

2,672,955

UNITED STATES PATENT OFFICE 2,672,955

HYDRAULIC VIBRATION DAMPER

René Lucien, Paris, France, assignor to Societe d'Inventions Aeronautiques et Mecaniques S. I. A. M., Fribourg, Switzerland, a corporation of Switzerland Application November 28, 1951, Serial No. 258,716

Claims priority, application France August 17, 1951

1 Claim. (Cl. 188—94)

The present invention relates to hydraulic vibration dampers or dash-pots of the type comprising an immersed double-acting piston, wherein a piston driven by the member subjected to the vibrations divides two chambers, one between each of its opposite faces and the corresponding end of the cylinder in which it moves, each of which alternately forms the working chamber, according to the direction of movement of the piston, and which with one another by passages formed through the piston, members being provided between the said chambers and the passages to control the circulation of the liquid between the two chambers for the purpose of providing the required damping effect.

The piston of the hydraulic damping device according to this invention is designed to meet, by means of the members provided therein, all the operational requirements arising out of the application of the damping arrangement in question to a particular type of vehicle and to damp appropriately the vibrations received for each of the two directions of movement of the piston.

In accordance with the invention, this result is obtained by the combined action of a sliding valve and a suitably calibrated spring co-operating therewith, the said valve consisting of a cylindrical body which is internally hollowed and mounted in a bore in the piston and which comprises over part of its side wall, longitudinal slots which, for some positions of the valve, constitute throttling means which cause loss of pressure in the liquid and through which the said liquid, compressed in one of the two chambers changes to the expanded condition in the opposite chamber, the said loss of pressure thus taking place in the immediate neighbourhood of the momentarily active face of the piston.

A constructional form of the hydraulic vibration damper according to the invention is illustrated by way of example in the accompanying drawings, in which:

Figure 2 is a view in section on the line A—A of Figure 1;

Figure 4 is a fragmentary sectional view showing on a larger scale the details of the sliding valve and of the calibrated spring co-operating therewith.

In these drawings, the parts which are the same at the two ends of the piston are designated by the same reference numerals, the index $a$ being added for the parts at one end.

Figure 1:
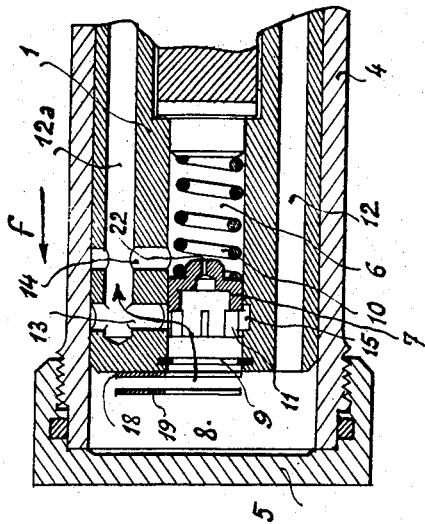
Figure 1 is an axial longitudinal sectional view of the damper.
Figure 3:
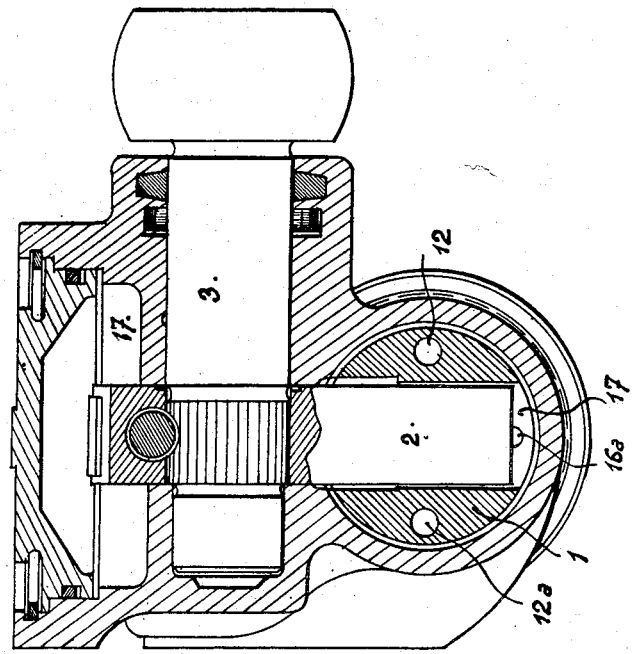
Figure 3 is a sectional view on the line B—B of Figure 1.

The piston 1 driven by the arm 2 connected to the shaft 3 of which the vibrations are to be damped moves in the cylinder 4 closed at each end by fluid-tight covers 5 and 5a.

Mounted in each of the bores 6, 6a formed in the body of the piston 1 is a sliding valve 7, 7a, the said sliding valves being situated at the points at which the said bores lead into the chambers 8 and 8a respectively enclosed by each of the end-faces of the piston and of the corresponding end of the cylinder 4.

The said slide valve, the course of which is limited by the abutment ring 9, 9a, co-operates with a compression spring 10, 10a, lodged in the corresponding bore 6, 6a, and it has in one part of its side wall, slots 11, 11a. There is preferably formed in the end of the said sliding valve a calibrated orifice 22, 22a of very small sectional area with respect to the slots 11, 11a.

Passages 12 and 12a respectively formed in the body of the piston afford communication between each of the chambers 8 and 8a respectively and the bore 6a, 6 corresponding to the opposite chamber. Each of the said passages leads into the bore through two ducts, one of which, 13, 13a, leads into a circular groove 15, 15a formed in the said bore, while the other 14, 14a leads into the same bore a little to the rear of the former.

In addition, two passages 16, 16a opening into the central spaces 17, filled by the reserve liquid, lead to the chambers 8, 8a, there being provided at the outlets from the said passages into each of the said chambers a shut-off valve 18, 18a of the known lamellar type, the said valve being provided with a stroke-limiting device 19, 19a.

Assuming that the vibration to be damped has the effect of moving the piston in the direction of the arrow $f$, the liquid will be compressed in the chamber 8, the passages 12, 13a and 14a and the bore 6a, and will be expanded in the chamber 8a, the passages 12a, 13 and 14 and the bore 6.

When the position 1 is stationary, or if its speed is very low, the slide valve 7 is held against its abutment 9 by the action of the spring 10. In this case, the two chambers 8 and 8a can communicate with one another only through the fixed orifices of very small area 12, 12a in the slide valves and through the clearances resulting from the movements due to the manufacturing tolerances, because in this position the slots 11 are masked by the bore 6.

When the speed of the piston travelling in the direction $f$ reaches a certain value, the slide valve 7 moves under the action of the fluid compressed in the chamber 8, thus compressing the opposing spring 10 (position illustrated in Figure 4). The slots 11 co-operating with the annular groove 15 define a variable fluid-throttling section, the said section being determined, in conjunction with the calibration and the deflection of the spring 10, as a function of the conditions to be fulfilled for the required damping effect. It is to be noted that the said throttling and the pressure drop resulting therefrom take place in the immediate neighbourhood of that face of the piston which encloses in this phase of operation the chamber in which the liquid is compressed. At this instant, the liquid under pressure in the chamber 8 cannot pass freely into the opposite chamber 8a because it is stopped by the valve 7a, which is held against its abutment 9a, with its ports 11a covered by the bore 6a, that is to say, out of communication with the groove 15a.

Owing to the transfer of the liquid from one working chamber into the other, the shut-off valves 18, 18a only operate accidentally when a contraction of the liquid, due to a temperature reduction, sets up a pressure difference between the chambers in which the liquid is in the uncompressed state (that is to say, the chamber 8a in the case of the phase of operation described) and the reserve contained in the central chamber 17.

The liquid employed in the damping arrangement hereinbefore described is preferably a binary or ternary liquid consisting, for example, of a mixture of linseed oil, alcohol and cyclohexanol, having at least one element, the volatility of which acts as a stabiliser for the viscosity of the mixture despite the temperature increase resulting from the operation.

I claim:
In a hydraulic dash-pot of the type including a piston, immersed in a fluid-tight cylinder filled with fluid, wherein the piston defines in the cylinder two chambers each enclosed between one face of the piston and the corresponding end of the cylinder, and further including communication ducts between the two chambers and slide valves for varying the flow area for the fluid as the piston is reciprocated in the cylinder; the piston comprising, at each face of the piston, a bore in the body of the said piston opening on to the corresponding face, an externally cylindrical hollow slide-valve in each said bore having an opening on the side of the corresponding face of the piston, a bottom wall, and lateral slots terminating at said opening, said bottom wall having a bleed hole therein of very small cross-section relatively to said slots, an abutment for the said valve in the neighborhood of the said face of the piston, a spring of suitable calibration disposed between the said valve and the closed end of the bore, a groove formed in the bore in a position to be closed by the slide valve when at rest, a first communication duct in the body of the piston extending from the said groove to the other side of the piston and a second communication duct in the body of the piston intermediate the position of rest of the slide valve and the closed end of the bore and extending from the said bore to the said first duct.

RENÉ LUCIEN.

References Cited in the file of this patent

FOREIGN PATENTS

| Number | Country | Date |
| --- | --- | --- |
| 955,225 | France | Jan. 9, 1950 |
| 959,299 | France | Mar. 27, 1950 |
| 641,251 | Great Britain | Aug. 9, 1950 |